Oct. 16, 1956  J. G. JACKSON ET AL  2,767,354
PANELBOARD
Filed June 20, 1952  2 Sheets-Sheet 1
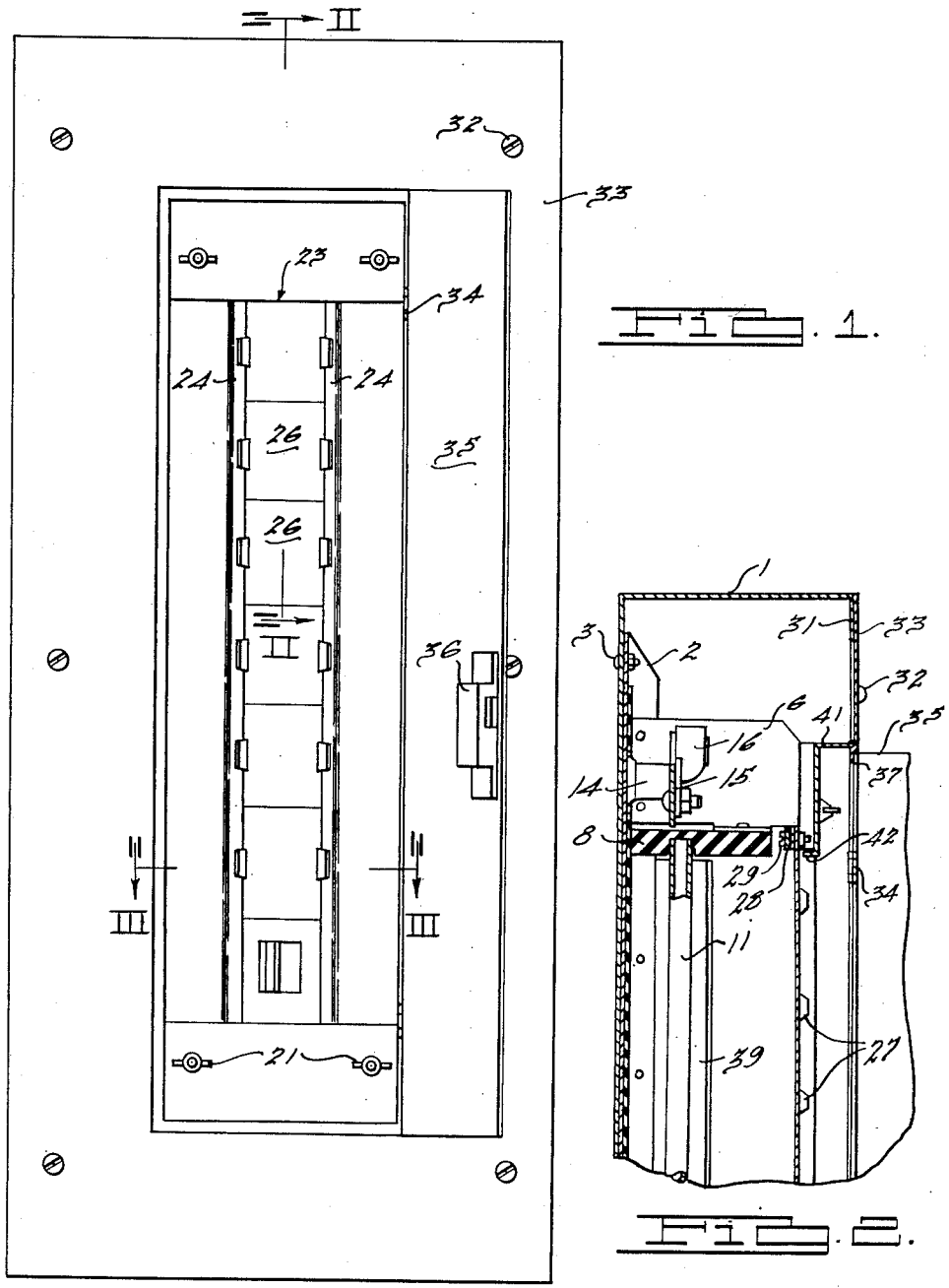
INVENTORS.
John G. Jackson,
Ralph H. Kingdon.
BY Myron J Seibold
ATTORNEY.

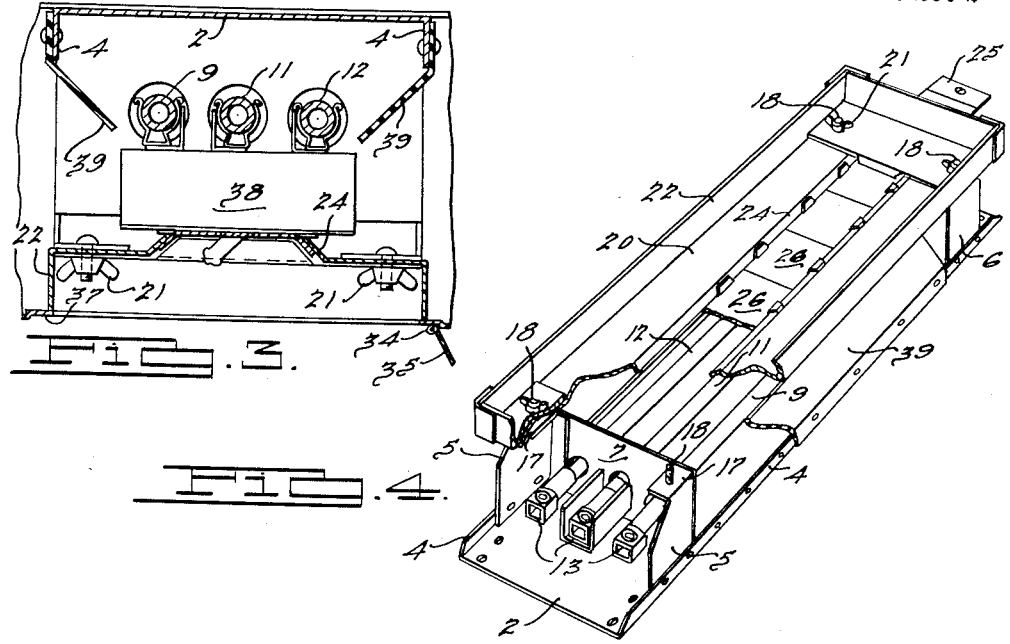

United States Patent Office 2,767,354
Patented Oct. 16, 1956

2,767,354

PANELBOARD

John G. Jackson, Detroit, and Ralph H. Kingdon, Birmingham, Mich., assignors to Square D Company, Detroit, Mich., a corporation of Michigan Application June 20, 1952, Serial No. 294,608

7 Claims. (Cl. 317—120)

This invention relates to an electrical panelboard; more specifically to a new and improved panelboard for enclosing electrical circuit controlling instrumentalities in which adjustable means are provided to selectively permit or prevent access to the enclosed current carrying means.

One object of the present invention is the provision of a new and improved enclosure for a circuit controlling device which provides great flexibility in regard to the types of instrumentalities which may be employed.

Another object of the present invention is the provision of a panelboard having enclosed current carrying means therein in which new and improved means are provided for safely utilizing the device, regardless of changes in the number of required circuit controlling instrumentalities.

Another object of the present invention is the provision of an improved panelboard having enclosed current carrying means, in which plug-in type circuit breakers, or the like, of varying widths may be inserted or withdrawn with ease, the structure preventing accidental contact with the bus conductors regardless of withdrawal of previously inserted circuit breakers.

Another object of the present invention is the provision of the device in accordance with the preceding objects in which a scored, slidable plate is employed at the front of the enclosure, the plate being positionable as desired.

Other objects and features of the present invention will be readily apparent to those skilled in the art from the specification and appended drawings illustrating certain preferred embodiments in which:

Figure 1 is a front elevational view of the device of the present invention.

Figure 2 is a partial sectional view along the plane of lines II—II of Figure 1.

Figure 3 is a partial sectional view along the plane of lines III—III of Figure 1.

Figure 4 is a perspective view of the sub-assembly of the present invention.

Figure 5 is a front view of the breaker retaining trim plate of the present invention.

Figure 6 is a rear view of the breaker retaining trim plate illustrating in dotted lines a moved position of the scored plate.

The device of the present invention comprises an enclosing box 1 on the interior surface of which is mounted a pan 2 by means of suitable fastening means such as bolts 3. The pan 2 has upstanding edges 4 at either side thereof, as shown in Figure 4. Adjacent one end of pan 2 there are mounted to upstanding edges 4 a pair of brackets 5, while adjacent the opposite end of the pan 2 a similar pair of brackets 6 are provided. Disposed between, and mounted to, the brackets 5 is an insulating plate 7, while the brackets 6 mount an insulating plate 8. A plurality of bus bars 9, 11 and 12 are provided, one end of these bus bars being supported in the insulating plate 8. The opposite end of these bus bars extend through the insulating plate 7 and are provided with suitable solderless connector elements 13, as may be seen in Figure 4. If desired, intermediate the insulating plates 7 and 8 suitable insulating supporting means may be provided for the bus bars.

Also provided upon the pan 2, adjacent the insulating plate 8 as shown in Figure 2, are a plurality of insulating supporting members 14, upon which is disposed a neutral plate 15 having suitable solderless connector units 16 disposed thereon.

Outer flanges 17 on the brackets 5 and 6 are provided, each of which supports an upstanding stud 18. Disposed upon these flanges 17 is a trim plate 19 having a plurality of suitable holes therein for cooperation with studs 18. Wing nuts 21 are provided to cooperate with the studs 18 and maintain the plate 19 in position, as illustrated in Figure 4.

Plate 19 comprises a pair of generally L-shaped members 20, each of which has an upstanding edge 22 and an inwardly bent portion 24, both edge 22 and portion 24 extending over the entire length of the member 20. Members 20 are mounted in spaced relation by transverse end pieces 30 of general L shape, the portions 24 being spaced apart to provide an opening 23 therebetween. Pieces 30 have an upstanding edge 41 and an inwardly bent portion 42, as shown in Figure 2.

As may be seen from Figure 4, the bus bars are accessible through the opening 23. This opening, however, is normally closed by a scored sliding plate 25, divided by the scores into a plurality of sections 26. Each of these sections 26 has a pair of outwardly extending lips 27 formed therefrom which are adapted to engage the outwardly facing surfaces of portions 24, the inwardly facing surfaces of the portions 24 being engaged by other parts of sections 26, as shown in Figure 6. The plate 25 is, therefore, movable only longitudinally. The underside of the plate 19 is provided with a bracket 28, best illustrated in Figure 6. Through bracket 28 extends a suitable adjusting screw 29 bearing against the underside of the sliding plate 25 to hold it in position as desired.

Box 1 has a peripheral flange 31 to which is mounted, by suitable fastening means such as bolts 32, a cover assembly 33. Cover assembly 33 is provided with hinges 34 which mount a door 35 having a lock 36, as illustrated in Figure 1. As shown in Figures 2 and 3, the cover assembly 33 has an inwardly disposed portion 37 which cooperates with the edges 22 and the edges 41 to prevent access to the interior of the box.

If desired, to each of the edges 4 of pan 2 may be mounted an inwardly extending insulating plate 39, as shown in Figure 3. Also, it will be seen that plate 19 could be directly mounted, as by welding, to the cover assembly 33.

When the structure of the present invention is in use, the circuit controlling units 38 will be positioned therein as illustrated in Figure 3. The units 38 shown herein are circuit breakers of the plug-in type. It will readily appear, however, to those skilled in the art, that the device of the present invention is in no way limited to circuit breakers as other types of circuit controlling instrumentalities may be employed. It is obvious, also, that other methods for connecting the units to the current carrying elements may be employed.

Prior to the connection of the device of the present invention in an electrical circuit, the scored sliding plate 25 is positioned as illustrated in Figure 5 so as to completely close the opening 23 provided in the plate 19. The screw 29 bears against the undersurface of the plate 25 to maintain the plate in position. When the user desires to insert a circuit controlling unit, such as the circuit breaker 38, the cover assembly 33 is removed from its engagement with the box 1, and the wing nuts 21 are removed whereby the plate 19 may be bodily removed from the box 1. The circuit breaker to be utilized is then attached to the bus bars. Wiring from the breaker to the load may then be accomplished, suitable knockouts being provided therefor in box 1. The screw 29 in the bracket 28 may be loosened whereby the plate 25 is freely slidable to any desired position, exposing enough of the opening 23 to accommodate the circuit breaker. The end of screw 29 is then tightened, and as it bears against the undersurface of the sliding plate 25, this plate will be held firmly in position so that one end thereof will be abutted against the side of the inserted circuit breaker. Reassembly of the plate 19 upon the studs 18, and reassembly of the cover assembly 33 upon the box 1 is then accomplished. It is apparent that if it should be required that more than one circuit controlling unit be put in use, the sliding plate 25 may be entirely removed or positioned as required.

If it becomes necessary to remove one or more breakers, or the like, after they have been in use in the device, plate 25 is slid over that portion of opening 23 formerly occupied by these breakers, and screw 29 tightened to hold plate 25 in its new position with the plate 25 closing the space previously occupied by the breakers and preventing access to the bus bars.

Should it become necessary to move the sliding plate 25 to such a degree that it would project beyond the wall of box 1, one or more of the segments 26 may be readily broken off from the plate 25 along the scored lines. Furthermore, if a change in the electrical requirements should necessitate removal of one or more circuit breakers after some of the segments 26 have been broken off, the device may be reassembled by placing these segments in position abutted against the units still in use in the device, and with the lips 27 of the segments 26 in engagement with the portions 24 in the original manner. The sliding plate may then be abutted against the end of the reinserted segment 26 and screw 29 tightened against plate 25 to maintain it as desired.

It will readily appear that the device of the present invention provides great flexibility in both the width of the circuit breaker or other circuit controlling unit utilized, and the number of such units which may be required. Access to the energized bus conductors may be prevented, by the device of the present invention, regardless of the fact that space had once been provided for access to these conducting means. It is well known that former devices of the type using "knockouts" or the like had no such desirable characteristics. It should be noted that regardless of the width of any circuit controlling unit employed, and even though its width is not equal to the length of a segment 26 or some multiple thereof, the slidability of the plate 25 provides that the circuit controlling unit may be inserted in contact with the energized bus bars and the remaining portion of the opening 23 firmly closed by the plate 25 so that danger of accidental contact with the bus bars is substantially eliminated.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electrical panelboard comprising supply means for carrying current to circuit controlling units and means providing an opening substantially aligned with said supply means whereby access may be had thereto, means for selectively preventing access to said supply means through said opening comprising a slidable plate divided into a plurality of segments by scores thereon, said segments being removable from the remainder of said plate by bending at the scores, a bracket on said means providing an opening, and a screw in said bracket normally bearing against said plate whereby said plate may be held in any desired position.

2. An electrical panelboard comprising an enclosing box, supply means within said box for carrying current to circuit controlling units, means mounting said supply means to the interior of said box, means within said box mounted forwardly of said supply means and providing an opening substantially aligned with said supply means whereby access may be had thereto, means for selectively preventing access to said supply means through said opening comprising a slidable plate, means mounting said plate within said opening and in engagement with those sides of said means providing an opening which define the opening, said plate having a plurality of scores thereon dividing said plate into a plurality of individual segments, said segments being removable from the remainder of said plate by bending at the scores, and a cover assembly mounted to said box in engagement with said means providing an opening whereby access to said supply means is everywhere prevented except through said opening.

3. An electrical panelboard comprising an enclosing box, supply means within said box for carrying current to circuit controlling units, means mounting said supply means to the interior of said box, means within said box mounted forwardly of said supply means and providing an opening substantially aligned with said supply means whereby access may be had thereto, means for selectively preventing access to said supply means through said opening comprising a slidable plate, means mounting said plate within said opening and in engagement with the sides thereof, said plate having a plurality of scores thereon dividing said plate into a plurality of individual segments, said segments being removable from the remainder of said plate by bending at the scores, means on each of said segments engaging said means providing an opening at both sides of said opening, a bracket on said means providing an opening, a screw in said bracket normally bearing against said plate whereby said plate may be held in any desired position, and a cover assembly mounted to said box in engagement with said means providing an opening whereby access to said supply means is everywhere prevented except through said opening.

4. An electrical panelboard comprising an enclosure, bus conductors mounted within said enclosure, circuit controlling units within said enclosure connected to said bus conductors, a partial cover for said enclosure having a central opening therein exposing parts of said circuit controlling units for access thereto, a plate for closing a part of said opening not occupied by said circuit controlling units, means for slidably mounting said plate on said partial cover for longitudinal vertical movement to any of a plurality of positions relative to said cover to expose any desired area of said opening, said plate being divided into a plurality of segments by scores therein providing for ready removal of the segments of the plate by bending at the scores when the segment to be removed is exposed for access by movement thereof beyond the cover by the longitudinal sliding movement of the plate, and means for releasably holding the plate in any desired position when it is so moved, said means for slidably mounting comprising ears at the opposite sides of the plate bent forwardly thereof and engaging the opposite side edges of the opening in said cover between the ears and the main body of said plate.

5. An electrical panelboard comprising an enclosure, bus conductors mounted within the said enclosure, circuit controlling units within said enclosure connected to said bus conductors, a partial cover for said enclosure having a central opening therein exposing parts of said circuit controlling units for access thereto, a plate for closing the part of said opening not occupied by said circuit controlling units, and means for slidably mounting said plate in said partial cover for longitudinal vertical movement to any of a plurality of positions relative to said cover to expose any desired area of said opening, said plate being divided into a plurality of said segments by scores thereon providing for ready removal of the segments of the plate by bending at the scores when the segment to be removed is exposed to access by movement thereof beyond the cover by the longitudinal sliding movement of the plate, and means for releasably holding the plate in any desired position when it is so moved, said means for slidably mounting comprising ears at the opposite sides of the plate bent forwardly thereof and engaging the opposite side edges of the opening in said cover between the ears and the main body of said plate, and said scores bisecting the part of said plate between said forwardly bent areas.

6. An electrical panelboard comprising supply means for carrying currents to circuit controlling units and means providing an opening substantially aligned with said supply means whereby access may be had thereto, means for selectively preventing access to said supply means through said opening comprising a slidable plate divided into a plurality of segments by scores thereon, said segments being removable from the remainder of said plate by bending at said scores, and means on each of said segments comprising ears at the opposite sides of said plate bent forwardly thereof and engaging the opposite side edges of said means providing an opening whereby said plate is supported, and means for releasably holding said plate in any of a plurality of desired positions.

7. An electrical panelboard comprising an enclosing box, supply means within said box for carrying current to circuit controlling units, means mounting said supply means to the interior of said box, means within said box mounted forwardly of said supply means and providing an opening substantially aligned with said supply means whereby access may be had thereto, means for selectively preventing access to said supply means through said opening comprising a slidable plate, means mounting said plate within said opening and in engagement with the sides thereof, said plate having a plurality of scores thereon dividing said plate into a plurality of individual segments, said segments being removable from the remainder of said plate by bending at the scores, said means for mounting said plate comprising ears at the opposite sides of said plate bent forwardly thereof and engaging the opposite side edges of said means providing an opening at both sides of said opening and between the ears and the main body portion of said plate, means for releasably holding said plate in any of a plurality of desired positions, and a cover assembly mounted to said box in engagement with said means providing an opening whereby access to said supply means is everywhere prevented except through said opening.

References Cited in the file of this patent

UNITED STATES PATENTS

| | | |
|---|---|---|
| 1,817,034 | Hotchkin | Aug. 4, 1931 |
| 1,952,719 | Lewis | Mar. 27, 1934 |
| 2,306,353 | Cole | Dec. 22, 1942 |
| 2,359,247 | Rowe | Sept. 26, 1944 |
| 2,530,548 | Stanley | Nov. 21, 1950 |